United States Patent [19]

Chen

[11] Patent Number: 4,808,297

[45] Date of Patent: Feb. 28, 1989

[54] PROTECTIVE SLURRY MIXTURE

[75] Inventor: Hong C. Chen, San Rafael, Calif.

[73] Assignee: Chevron Research Company, San Francisco, Calif.

[21] Appl. No.: 115,229

[22] Filed: Oct. 30, 1987

Related U.S. Application Data

[63] Continuation of Ser. No. 585,100, Mar. 1, 1984, abandoned.

[51] Int. Cl.$^4$ .................. C10G 35/10; C10G 35/14
[52] U.S. Cl. ................................ 208/164; 208/152; 208/157; 208/134; 208/112; 208/111; 208/153; 502/64; 502/238; 502/239; 502/327; 502/332; 502/355
[58] Field of Search ............... 208/146, 152, 112, 298, 208/134, 157, 164; 502/235, 254, 255, 258, 259, 260, 305, 311, 239, 238, 327

[56] References Cited

U.S. PATENT DOCUMENTS

| | | | |
|---|---|---|---|
| 3,887,455 | 6/1975 | Hamner et al. | 208/112 |
| 3,901,660 | 8/1975 | Ottorodnik et al. | 208/157 |
| 3,960,708 | 6/1976 | McCollum et al. | 208/121 |
| 4,059,502 | 11/1977 | James | 208/152 |
| 4,062,809 | 12/1977 | Ward | 502/254 |
| 4,376,695 | 3/1983 | Belinko et al. | 208/59 |

Primary Examiner—Anthony McFarlane
Attorney, Agent, or Firm—S. R. La Paglia; T. G. DeJonghe; V. J. Cavalieri

[57] ABSTRACT

By use of a slurry mixture described herein, catalyst particles or other similar particles can be transferred over considerable temperature differential without breaking or crumbling.

By selecting a carrier fluid with a combination of high critical temperature and low critical pressure relative to the conditions under which the particles will function, a slurry mixture is provided which protects the contained particles against breakage.

11 Claims, 1 Drawing Sheet

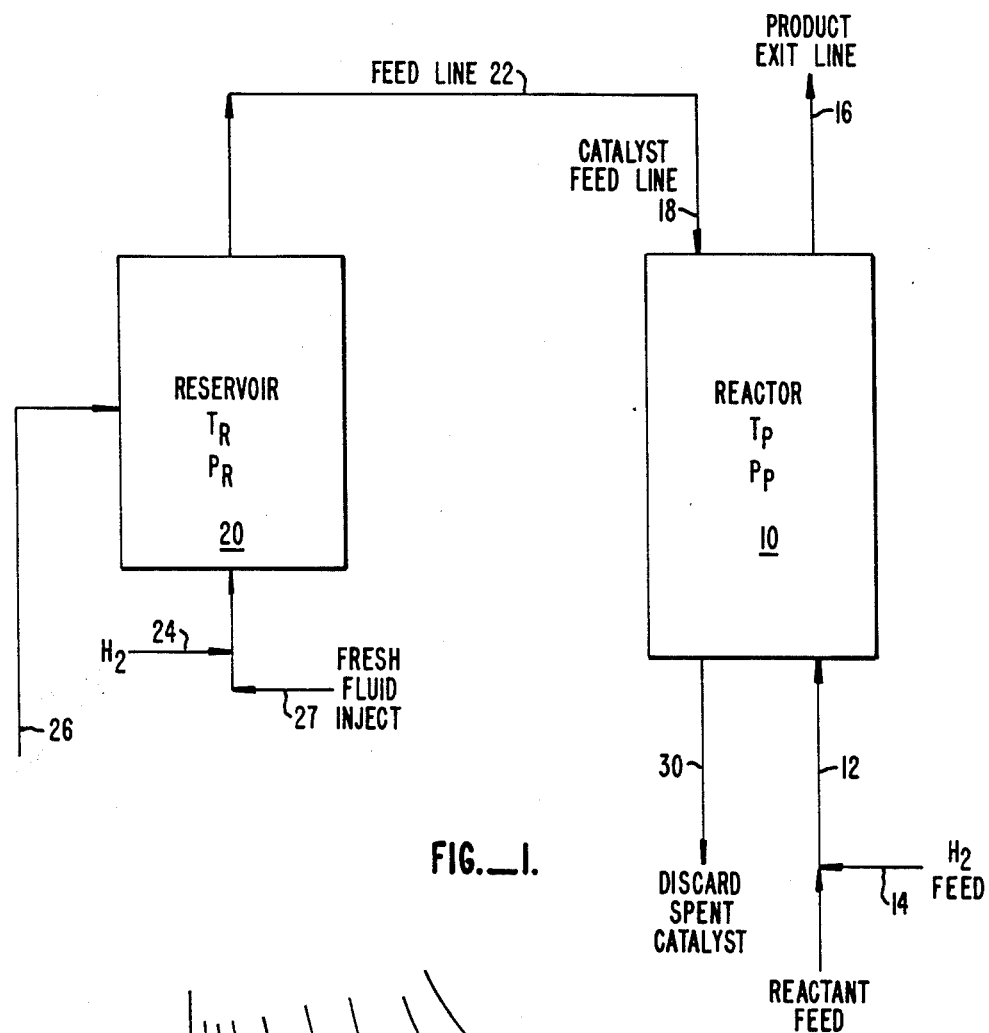
FIG._1.
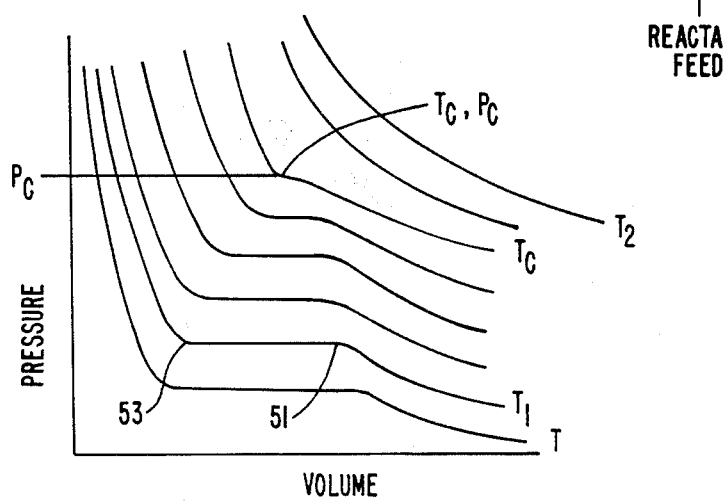
FIG._2.

4,808,297

PROTECTIVE SLURRY MIXTURE

This is a continuation of application Ser. No. 585,100, filed Mar. 1, 1984, now abandoned.

BACKGROUND

This invention relates to the problem of transfer of solid particles between vessels in situations where there is a temperature differential between the two vessels. More specifically, the invention relates to use of a fluid to suspend the particles in a slurry mixture which will accomplish such transfer causing minimal damage to the particulate transferred substance.

There are a number of industrial processes for which it is desirable to transfer solids from one container to another and simultaneously to effect a temperature increase. Prominent among these processes are catalyzed reactions such as those in the petroleum industry which often involve catalysis of reactions carried out at high temperature. Generally, such catalysts are solids with high surface areas and, although not directly consumed in a catalyzed reaction, become "spent" as the reaction is repeated either through contamination or decomposition. In such cases, it may be desirable to continue to transfer the catalyst into the reactor when the reactor is at high temperature. While it is possible to replace such spent catalyst by dismantling the reactor and replacing the catalyst directly or by using a series of reactors and alternately taking one or more "swing" reactors out of the process stream, then separately and directly replacing or reactivating the catalyst in the swing reactor, a number of continuous catalyst replacement systems have also been devised. In these latter cases, it is inevitable that transfer from a lower to a higher temperature will be required.

All of the above processes fail to address the problem of catalyst breakage. Because the catalyst reservoir containing the fresh or regenerated catalyst is generally at a temperature considerably lower than that at which reaction takes place or even than the temperature of a shut-down reactor, catalyst entering the reactor is exposed to considerable temperature, and, therefore, internal pressure shock.

The catalyst particles, in general, contain the active material on the surface area of a support which is formed from such inert material as aluminum oxide, silica, mixtures of alumina and silica, or Zeolite. The efficiency of the catalyst depends on the high surface area to which such catalytic materials as vanadium, cobalt, molybdenum, nickel, tungsten, and the like (depending on the reaction to be catalyzed) are to be found. Typically, one gram of such catalyst has a surface area of several hundred square meters. In order to achieve this surface area, and still retain practical particle size, the particulate forms of the the catalyst must be extremely porous. Such porosity, however, results in pockets of liquid or vapor within each individual particle which, upon vaporization and/or expansion due to a temperature increase, can, and do, cause serious breakage problems to the catalyst. In short, when the regenerated catalyst is transferred back into the reactor at a high temperature, expansion of fluid in the particle pores causes break-up of the particles so that the resulting fine powders are both difficult to handle and less efficient as catalyst. Of course, the presence of finely divided powdered materials will cause ancillary problems with respect to system blockage and contamination of the reactant stream.

The present invention is directed to utilizing a slurry mixture containing suspended catalyst or other particulate multiple pore solids, such that the mixture can be transferred from a storage tank of a lower temperature to a location of higher temperature, where, in most practical applications, reaction takes place. By use of the slurry mixture of the invention, catalyst particles or other similar particles can be transferred over considerable temperature differentials without breaking, or crumbling so that it is possible to avoid generating the problems that ensue from such breakage.

SUMMARY OF THE INVENTION

In one aspect, the invention provides a slurry mixture which is capable of effecting the transfer of the contained porous particles, usually catalyst particles, without causing breakage or destruction of the particles, even though the transfer results in a temperature elevation which, absent the self-protection of the slurry mixture, would vaporize entrapped liquid in the pores. The slurry mixture of the invention is protected from evaporation of the fluid by virtue of the characteristics of the added fluid. The fluid is specifically chosen so that its critical temperature is higher than the elevated temperature to which the particles are to be transferred, and the critical pressure of the fluid is less than the ambient pressure at the location to which transfer takes place. By selecting a carrier fluid with this combination of high critical temperature and low critical pressure relative to the conditions under which the particles will function, a mixture is provided which protects the contained particles against breakage.

Thus, in one aspect, the invention relates to a slurry mixture which comprises suspended solid particles in a slurry fluid, useful for transferring suspended solid porous particles to a site of higher temperature, the mixture being characterized in that the fluid has a critical temperature higher than this elevated temperature and a critical pressure below that of its ambient pressure.

In a second aspect, the invention concerns a method of transferring porous particles from a lower to higher temperaure using this slurry mixture.

BRIEF DESCRIPTION OF THE DRAWINGS

FIG. 1 is a schematic of the transfer system to which the slurry mixture and method of the invention are applicable.

FIG. 2 is an archtypical phase diagram useful in understanding the method of the invention.

DETAILED DESCRIPTION

A. Definitions

"Critical temperature" and "critical pressure" have their standard meanings as conventionally used in Physical Chemistry. Critical temperature ($T_c$) is a temperature at which a gas can be liquified by the critical pressure; above this temperature, the gas cannot be liquified at any pressure. Critical pressure ($P_c$) is the pressure necessary to condense a gas at the critical temperature. These terms are further explained in connection with the description of FIG. 2 hereinbelow.

"Site" as used in connection with this invention refers to a location at which the porous particles transferred in the slurry mixture are found. Such site may be typically a vessel or tank such as a reactor, regenerator, or holding tank. However, the sites of lower and of higher temperature, as referred to in the invention description, and in the claims, while ordinarily physically separated, are not necessarily so. The slurry mixture and method of the present invention will protect the porous particles from breakage even if the temperature is raised at a given location. Therefore, the phrase "transfer from a first site to a second site of higher temperature" can refer either to a transport of material from one physical location to another, or simply to an increase in temperature.

"Porous Particles" refers to particulates ranging in size from a diameter of about 0.1 mm to 15 mm for spheres or cylinders which are permeated by sufficient pores and intraparticulate spaces to achieve a surface area of the order of 10 to 1,000 square meters per gram of material. These particulates are used in a variety of shapes, spheres and cylinders being merely the most common.

"Slurry mixture" refers to a suspension of porous particles in a fluid phase material which carries along the porous particles in transferring them from one site to another. The fluid may be entirely liquid at the temperature and pressure of the catalyst reservoir or it may be liquid in admixture with some vapor. When both vapor and liquid are present, the liquid phase of this combination, which will include some dissolved molecules of the vapor phase, is referred to as the "fluid" portion of the slurry mixture.

B. General Description

A system to which the invention is applicable is shown in FIG. 1. The system is shown as a countercurrent system, but this does not need to be the case; the flows of slurried catalyst and of the reactants can also be in the same direction. Further, this illustrative system shows the use of hydrogen as part of the reactant stream in the reactor; this aspect is process dependent and not necessarily typical for all systems.

The system shown for illustration in FIG. 1 is appropriate for cracking of residuum fractions in petroleum refining, and the features relating to hydrogen feed and nature of catalyst reflect this specific example. In FIG. 1, a reactor, 10, contains a moving catalyst bed which is comprised of porous particles over which a reactant stream 12 is added. The reactant stream contains higher molecular weight hydrocarbons along with hydrogen gas, added at 14. The mixture of hydrogen gas and high molecular weight hydrocarbons enter the reactor and pass over the catalyst bed in the direction shown, and are then expelled at 16, having been "cracked" to lower molecular weight products. Countercurrent to this product stream is an incoming supply of fresh catalyst, 18, which is transferred from the catalyst reservoir, 20, through the feed line, 22. If desired, a hydrogen stream, 24, may be added to the inflow of catalyst or fluid to the catalyst reservoir in order to supply pressure for transporting the catalyst. Supply of pressure for flow of the catalyst stream may alternately be handled by placing, for example, a pumping mechanism in the line 22. Some method for regenerating the catalyst in a regenerating tank can also be provided, although this is peripheral to the invention. Alternatively, the spent catalyst from line 30 is simply discarded and a fresh supply introduced to the reservoir through line 26. This schematic permits the amount of fluid with respect to catalyst to be adjusted; additional greater or lesser amounts of fluid are added to the reservoir at 27.

In the operation of the method of the invention, catalyst is withdrawn from the reactor 10 through the line 30 and discarded. A regenerator could also be provided where, depending on the nature of the process catalyzed, impurities are removed or other alterations made to the surface of the catalyst. In petroleum refining, typically the catalyst becomes encrusted with coke and metals from the residuum and must be reclaimed by removal of all but a very small amount of the deposited material or fresh catalyst must be supplied. If in-line regeneration is not included, and the catalyst in line 30 is discarded, a slurry of new particles is added to the reservoir through line 26.

The fresh or regenerated particles are introduced to a reservoir 20 from which they are pumped into the reactor at 18. The slurry mixture of the invention is, in this illustration, the mixture of particulates and fluid exiting through line 22, the suspension of solids having taken place in the mixture of fresh fluid introduced directly into the reservoir from line 27 combined with a portion of fluid in which catalyst particles are suspended from 26. Other configurations are, of course, permissible. The fresh or regenerated catalyst then proceeds through the reactor before being withdrawn from line 30 so that catalyst can be removed on a first in/first out basis.

For most processes, the temperature in the reactor $T_P$ is quite substantially higher than that found in the reservoir $T_R$. Typical reactor temperatures may vary from room temperature to about 1000° F. but are ordinarily in the range 300° to 850° F.; those in the reservoir are lower, but may vary from about room temperature to about 200° F. The temperature ranges involved depend, of course, on the process being conducted. Pressures in the reactor are typically 500-3000 psi. Those in the reservoir are slightly higher in each particular case, resulting in the desired direction of fluid flow.

As the material to be transported is in the form of porous particles, evaporation of the transporting fluid in the suspension would cause breakage of these particles due to vaporization within the pores. This can be prevented by the use of a slurry mixture of the invention wherein the fluid carrier is selected from the group consisting of fluids having desirable thermodynamic characteristics. The selection of carrier fluid takes advantage of thermodynamic characteristics as assessed prior to addition to the particle reservoir to form the slurry mixture of the invention, whether this fluid is supplied as a liquid and vapor free, or as a liquid mixed with, for example, hydrogen gas as a carrier.

For the liquid phase, i.e., the slurry "fluid," a typical behavior pattern is exhibited in FIG. 2. FIG. 2 represents a pressure/volume diagram for a single substance and is similar in general aspects for all substances and for mixtures as well; only the numbers placed on the coordinates and on the temperature lines will be different. This diagram is a series of constant temperature lines showing the behavior of the volume of the substance as the pressure is changed. Below the critical point, $T_c$, $P_c$, as the pressure is raised at a given temperature, a pressure is reached at which condensation to liquid occurs and a volume decreases drastically—i.e., horizontally, to liquefaction. Thereafter, the change in volume with respect to pressure is very much decreased. Following, for example, line $T_1$ (which is below the critical point) as the pressure increases, the volume follows line $T_1$ until the pressure at which liquefaction occurs (51) is reached, the volume then diminishes dramatically to 53. After condensation, further increases in pressure have very little impact on the volume of the sample. Turning now to the curve labeled $T_c$ which is the curve for the critical temperature, again the pattern of decreasing volume with increased pressure prevails, but at the critical point there is no discontinuity, and although the pressure/volume curve becomes steeper, there is no intervening sharp decrease in volume. Finally, at temperature $T_2$ which is higher than the critical temperature, there is a smooth relationship between volume and pressure even at very high pressures. It is seen that in the region above the critical pressure and below the critical temperature the constant temperature lines lie very close together and are generally vertical. This implies that in this region changes in pressure and temperature make very little difference in the volume of the material. Accordingly, it is possible for a great change in temperature to occur when the ambient temperature is below the critical temperature and the ambient pressure is above the critical pressure without a change in phase (or much change in volume) of the material. The pressure must be above the critical pressure; otherwise the substance may nevertheless, evaporate if the pressure is low enough. Thus the fluid chosen as carrier in the suspensions forming the slurry mixture of the invention must obey the generalization that $T_c > T_p$, $P_c < P_p$.

In summary, it is protective of the carried porous particles if the fluid chosen as carrier is selected so that its $T_c$ is above the highest temperature to which the particles are to be subjected, and the critical pressure is below the pressures at which the reactor will operate. The definition of these requirements permits selection of a suitable single substance fluid to make the slurry suspension of the invention by examination of commonly available tables containing these critical constants, or of other properties, such as boiling points, which are rough indices of $T_c$ and $P_c$. Such tables are found, for example, in commonly available sources such as *Handbook of Chemistry and Physics,* published by the Chemical Rubber Co. *The American Petroleum Institute Technical Data Book for Petroleum Refining,* Vol. 1, Ch. 1 (API 1977), and API Research Project 44: *Selected Values of Properties of Hydrocarbons and Related Compounds,* Vol. 2, Thermodynamic Research Center, Texas A&M University, 1969, also give such values. The *Technical Data Book* (supra at Ch. 4) provides formulas for finding $T_c$ and $P_c$ for hydrocarbon mixtures which are encountered as petroleum refining fractions. This source further provides formulae for calculation for $T_c$ and $P_c$ from boiling points and specific gravities of pure substances or of mixtures, including formulas applicable in instances where the liquid phase contains known amounts of dissolved gas.

If the fluid is to be mixed with a gas such as, for example, hydrogen gas, the thermodynamic constants for the mixture can be calculated by means of equations which are available in the art. For example, in addition to the above-mentiond references, these equations are published in such discussions of a gas and liquid characteristics as Reid, R. C. et al, *Properties of Gases and Liquids,* Third Edition, McGraw-Hill (1977) or Prausnitz, J. M., *Molecular Thermodynamics of Liquid Phase Equilibria,* Prentice-Hall (1979). The calculation is reasonably complex, but an estimate of the critical pressure or critical temperature of the mixed material can be made by means of a linear interpolation between the corresponding parameters of the two pure substances to be mixed, if only a small amount of one of them is present. Briefly, while the equations indicate that the variation of these properties at various proportions between the two pure materials is nonlinear, the deviations from linearity close to either end of the curve are relatively small. Thus, for a mixture of octadecane which has a critical temperature of approximately 881° F. and hydrogen which has a critical temperature of −400° F., a ten mole percent mixture of dissolved hydrogen in the octadecane would have a critical temperature of approximately $$881 - \left(\frac{881 - (-400)}{10}\right)$$

or approximately 753° F. Such approximations can conveniently be made and are typically of sufficient precision to obviate any need to do a precise calculation using the cited equations.

Furthermore, it appears that there is a reasonable correlation between boiling points at atmospheric pressure and critical temperatures and pressures at least for any homologous series. Thus, for example, the boiling points and critical temperatures and pressures of saturated hydrocarbons from $C_{11}$ to $C_{20}$ are given in Table I.

TABLE I

| Compound | BP (°F.) | $P_c$(psi) | $T_c$(°F.) |
|---|---|---|---|
| n-undecane | 384.6 | 285 | 690.0 |
| n-dodecane | 421.3 | 264 | 725.2 |
| n-tridecane | 433.8 | 250 | 756.7 |
| n-tetradecane | 488.5 | 235 | 783.7 |
| n-pentadecane | 519.1 | 220 | 812.5 |
| n-hexadecane | 548.2 | 206 | 837.3 |
| n-heptadecane | 575.9 | 191 | 860.4 |
| n-octadecane | 602.1 | 176 | 881.8 |
| n-nonadecane | 627.1 | 162 | 901.0 |
| n-eicosane | 650.8 | 162 | 921.0 |

It is seen that the $T_c$ associated with a fluid increases with boiling point. Thus an estimate of the proper $T_c$ characteristic for proposed liquid portion of the fluid can be estimated through an examination simply of atmospheric boiling points.

It is also seen that critical pressures diminish in general as critical temperatures increase. Thus, an examination of the preceding data indicates that the critical pressures between $C_{11}$ and $C_{20}$ decreases from 285 psi to 162 psi while the critical temperature increases from 690° F. to 921° F. Thus, critical temperature and pressure vary concomittantly with respect to desirable properties of the fluid—i.e., as the critical temperature becomes higher making the fluid satisfactory for a higher range of reactor temperatures, the critical pressure becomes lower, also resulting in a satisfactory performance inclusive of lower reactor pressure ranges. The boiling points of the series increase monotonically from 384.6°–650.8°, tracking the progression of desirable $T_c$ and $P_c$ values. The boiling point index therefore provides at least the first approach to selection of such fluids based both on the temperature and pressure criteria.

It is clear from an examination of critical pressures for normally encountered liquids that the critical pressure for most is several times that of the atmosphere. Hence, most commonly used liquids are appropriate only for high pressure processes. On the other hand, reasonably high temperatures can be tolerated by the range of critical temperatures.

C. Examples

The following examples are presented to illustrate but not to limit the invention.

C.1 Residuum Processing

A suitable application of the method of the invention is residuum processing, a procedure of considerable importance in the refining industry. Briefly, crude petroleum is distilled into the more valuable gasoline, jet fuel, and diesel fractions by heating the crude stock to approximately 650° F. The fraction boiling higher than 650° F. is referred to as the "long residuum." It contains two subfractions which are separated by distillation under vacuum, a gas oil fraction which distills fairly readily, and a residuum from this vacuum distillation, which would, at atmospheric pressure boil at 1000° F. or higher. This high boiling fraction is referred to as the "short residuum." Either the long or short residuum can be converted to transportation fuel, i.e., to lower molecular weight, lower boiling fractions by hydrocracking. Hydrocracking comprises treating, with hydrogen in the presence of a catalyst. Typical catalysts are high surface area porous particles of alumina, silica, alumina/silica mixtures, or Zeolite, containing at their surface various catalytic metals such as tungsten, cobalt, molybdenum, nickel, or vanadium. Typically these catalysts have a surface area of approximately 1–400 sq. meters per gram. The process is carried out in a reactor at approximately 300°–850° F. and a pressure of 500–3000 psi. As the cracking reaction proceeds, the catalyst becomes contaminated or "spent," and typically lasts only a few weeks to a month.

As explained above, the most efficient way to regenerate or replace this catalyst is by virtue of a continuous moving bed in the reactor so tha the catalyst is cycled through the reactor on a first in-first out basis. The portion of catalyst with the longest residence time in the reactor is withdrawn and replenished with fresh catalyst from a reservoir. The replacement catalyst, however, needs to be taken from the relatively low temperature reservoir into the high temperature reactor. In order to prevent breakage of the catalyst during this transfer process, an appropriate suspension of the particles as a slurry mixture is used. Hydrogen gas may also be added since it is utilized in the cracking process and thus is often dissolved in the slurry mixture due to contact in the reactor regardless of whether added deliberately or not. It is estimated that the resulting carrier fluid for the suspension is never more than approximately 7 wt% hydrogen (90 mole%). Of this, however, only a very small portion is, in fact, dissolved in the liquid phase. It is this portion which determines the desired characteristics for the "slurry fluid" contained in the particles. Therefore, only small deviations from the critical constants of the liquid itself is expected for the fluid mixture by virtue of added hydrogen.

An examination of the data in Table 1 indicates which of these normal saturated hydrocarbons have satisfactory properties to serve as suitable fluids. As hydrocracking generally takes place at 500–3000 psi, all of the solvents have a $P_c$ below that which would be ambient in the reactor, and thus, are satisfactory from the pressure criterion. Choice of those which would be satisfactory from the standpoint of $T_c$ depends on the reactor temperature $T_p$, which can vary over a range which would exclude some lower boiling representatives.

As one example, one might choose a $T_p$ of 750° F. Tridecane is the lowest boiling liquid having a $T_c$ greater than this value.

The boiling point of tridecane is approximately 450° F.; the data in Table 1 show that any of the saturated hydrocarbons longer than tridecane which, therefore, also have higher boiling points, would be satisfactory as the fluid, with increasing versatility and assurance as the number of carbons increases. Thus, as a first approximation, one might seek a fluid for the slurry mixture with a boiling point higher than 450° F. Especially as there is some lowering of critical temperature due to the admixture of hydrogen, however, it is preferable to use a liquid which has a $T_c$ comfortably above the intended reactor temperature. Thus, for this example, which involves $T_p=750°$, substances with $T_c$ greater than 830° F., e.g., n-hexadecane, are preferred. This corresponds to a boiling point of 548° F.

Another example shows the use of refining cuts rather than pure hydrocarbons, for a typical mode of operation, where the reactor is kept at 2000 psi and is operated at 500° F. Arabian Heavy distillates which have a boiling range of 450°–650° F. and a dissolved hydrogen content in the liquid phase of 0.2 wt% or 21 mole%, based on total wt% $H_2$ of the liquid/vapor mixture of 4% (83 mole%). This mixture is calculated by the above referenced equations to have $T_c=599°$ F. and $P_c=255$ psi values which are clearly in the desired range. A higher boiling fraction, boiling above 770° F. under the same conditions of added hydrogen, is calculated to have $T_c=851.5°$ F. and $P_c=190.5$ psi. Thus both would provide suitable fluid for the desired slurry mixture, though the latter gives a greater margin of acceptability.

C.2 Effect of Fluid Boiling Point on Catalyst Breakage

Experiments were undertaken to determine the effect of the boiling range of the added fluid on catalyst breakage. In each experiment, a 3 cc sample of catalyst was slurried in 10 cc of slurry fluid at 150° F. 2000 psi and dropped into a catalyst basket in an autoclave which had 750° F., 2000 psi, ambient conditions and was filled with Arabian Heavy atmospheric residuum circulating continuously through the catalyst basket. Thus, in these experiments, the temperature between site 1 and site 2 varies by 600° F.

Residuum catalyst used for hydrocracking was suspending in various types of fluid and the breakage in such slurry mixtures assessed by % recovery of catalyst and by visual examination of breakage in the recovered portion. When kerosene, b.p. 335°–572° F., was used as the carrier fluid, only 67% of the catalyst was recovered and considerable breakage was observed. When a control sample was run transferring the catalyst from the physical position of site 1 to the physical position of site 2, but at constant (150° F.) temperature, using the same kerosene as fraction carrier, no breakage occurred. Thus breakage is due to T, not to mechanical forces. However, when a refinery sidecut having a boiling range of 640°–911° F. was used as carrier fluid over the 150°–750° range, no significant breakage was observed and virtually all of the catalyst was recovered.

I claim:

1. A slurry mixture used in transferring porous catalyst particles from a catalyst reservoir at a temperature in the range of from room temperature to about 200° F.

to a reactor site of higher temperature in the range of up to 1000° F. and lower pressure which mixture comprises a suspension of the porous catalyst particles in a carrier fluid wherein the critical temperature of the carrier fluid is above the temperature of the reactor site, the boiling point at atmospheric pressure of the carrier fluid is lower than the temperature of the reactor site and the critical pressure of said fluid is below the ambient pressure of the reactor site.

2. The mixture of claim 1 wherein the pressure in the reactor site ranges from 500–3,000 psi.

3. The mixture of claim 1 wherein the temperature in the reactor site ranges from 300° to about 800° F.

4. The mixture of claim 1 wherein the fluid is a liquid having a boiling point greater than 450° F. containing dissolved hydrogen.

5. The mixture of claim 1 wherein the reactor site is a hydrocracking reactor or reforming reactor.

6. The mixture of claim 1 wherein the reactor site is a hydrocracking reactor.

7. In the method of transporting a slurry mixture of porous catalyst particles in a carrier fluid from a first catalyst reservoir to a reactor site of higher temperature and lower pressure, the improvement which comprises using as a slurry mixture, a composition which comprises porous catalyst particles in a carrier fluid wherein the fluid in said slurry mixture has a critical temperature above the temperature of the reactor site, a boiling point at atmospheric pressure below the temperature of the reactor site and a critical pressure below the ambient pressure of the reactor site.

8. A method of claim 7 wherein the temperature of the catalyst reservoir is in the range of from room temperature to about 200° F., the temperature of the reactor site is in the range of from 300° to about 800° F., and the pressure of the reactor site is in the range of from 500–3,000 psi.

9. The method of claim 7 wherein the fluid is a liquid which has a boiling point of more than 400° F. containing dissolved hydrogen.

10. The method of claim 7 wherein the reactor site is a hydrocracking reactor or reforming reactor.

11. The method of claim 7 wherein the reactor site is a hydrocracking reactor.

* * * * *